June 11, 1940.  G. F. SCHLOTE  2,204,514
TRANSMISSION
Filed June 3, 1937   10 Sheets-Sheet 2

Inventor
G. F. Schlote
By L. F. Kaufrich
Attorney

Inventor
G. F. Schlote

June 11, 1940.    G. F. SCHLOTE    2,204,514
TRANSMISSION
Filed June 3, 1937    10 Sheets-Sheet 9

Inventor
G. F. Schlote

Patented June 11, 1940

2,204,514

UNITED STATES PATENT OFFICE 2,204,514

TRANSMISSION

Guido F. Schlote, Milwaukee, Wis., assignor to The Automatic Power Transmission Company, Inc., Ogden, Utah Application June 3, 1937, Serial No. 146,160

8 Claims. (Cl. 74—571)

This invention relates to a mechanism for transmission of power to a load at infinitely variable speeds which are manually selected, adjusted and controlled.

In part, the instant invention constitutes improvements over the structure disclosed in Letters Patent No. 2,026,142, issued to me December 31, 1935, for Transmission mechanism.

One aim is to provide a novel combination of clutch and transmission adapted to replace the present gear-reducers, torque converters and other standard conventional transmissions, being connected to the power shaft of any motor or engine, preferably between motor or engine and load to be pulled.

A second object is to provide means by which the proper gear ratios for any load can be selected and provided manually while the power is under load to produce the greatest efficiency of power-output towards its load.

A third object is to provide a novel construction of the character set forth wherein control is effected by means of parts manually operated to vary the speed of the load to be pulled.

A fourth object is to provide in such device a set of overrunning clutch means coacting with the crank shaft or equivalent for transmitting motion at various speeds in the same or opposite direction as the direction of the load.

A fifth object of the invention is to provide a mainshaft in two sections, that is a front shaft section and a rear shaft section, the front shaft section being equipped with means to manually move the overrunning clutch means from centric to eccentric position and vice versa in radial direction while said front shaft section is turning.

A sixth object of the invention is to provide an improved device of the character set forth which will enable the user to apply practically unlimited power to the load, being able to select any ratio desired from a given highest to the standstill or zero ratio without the possibility of slippage, and without depending on friction as to power transmission.

It is also aimed to provide a construction which is durable, practical, efficient and relatively simple and inexpensive.

Various additional objects and advantages will become apparent from a consideration of the description following taken in connection with the accompanying drawings illustrating an operative embodiment.

In said drawings—

Figures 5 and 5A, selectively, is an enlarged longitudinal sectional view through the central portion of the apparatus;

Figures 5 and 5A, selectively, is an enlarged longitudinal sectional view through the central portion of the apparatus;

Referring specifically to the drawings wherein like reference characters designate like or similar parts, 10 designates a suitable casing or housing, having for instance, a main section 11 provided with a vertical web at 12, and also having removable front and rear end sections 13 and 14, respectively, bolted to the section 11 as at 15 and 16. Aligned, but independently movable main shaft sections are journaled centrally of the casing 10, being designated 17 and 18. Shaft 17 is mounted in suitable ball-bearing devices at 19 and 20, which are supported by the end section 13 and the web 12 while the shaft section 18 is mounted in ball bearing devices at 21 and 22, positioned by the web 12 and end section 14, respectively. A ring plate 23 is bolted at 24 to the section 14 and surrounds the shaft section 18 and mounts an oil retaining ring at 25. Such rear shaft section 18 has a gear or pinion 26 keyed thereto.

Presuming the transmission to be used in connection with an automobile, the crank shaft and the propelling motor of that vehicle is connected in any suitable manner rigidly to the shaft section 17. The shaft section 18 leads to the differential or rear wheel drive (not shown) of the automobile or vehicle. Through mechanism hereinafter described, the rotation of shaft 17 imparts its motion to a plurality, preferably three, auxiliary shafts 27, equidistantly spaced from each other and about the axis of the shafts 17 and 18. Such shafts 27 are journaled in suitable antifriction bearing devices 28 mounted by the end section 13 and anti-friction bearing devices 29 mounted in the web 12. Each auxiliary shaft 27 has a pinion 27a keyed thereto and enmeshed with the gear or pinion 26.

A pair of control or governor devices generally designated 30 are carried by the forward shaft section 17 and rotates therewith. The governor devices are movably radially outward in opposite directions relative to the shaft section 17.

Such devices consist of sections 31 attached together about reduced portions 33 of such shaft 17 by means of screws 32. Collectively, the sections 31 provide elongated openings 34 through which the reduced shaft portions 33 extend and which portions have channels 35 across the same positioning and accommodating rack members 36, which are connected to the sections 31 by screws 37 or the equivalent.

Each control or governor device 30 has a plurality of ring links 38 journaled thereon, one for each of the auxiliary shafts 27. Such ring links 38 are preferably split at 39 and secured together by means of a bolt or the like 40, facilitating attachment and detachment and accurate fitting.

Figure 1:
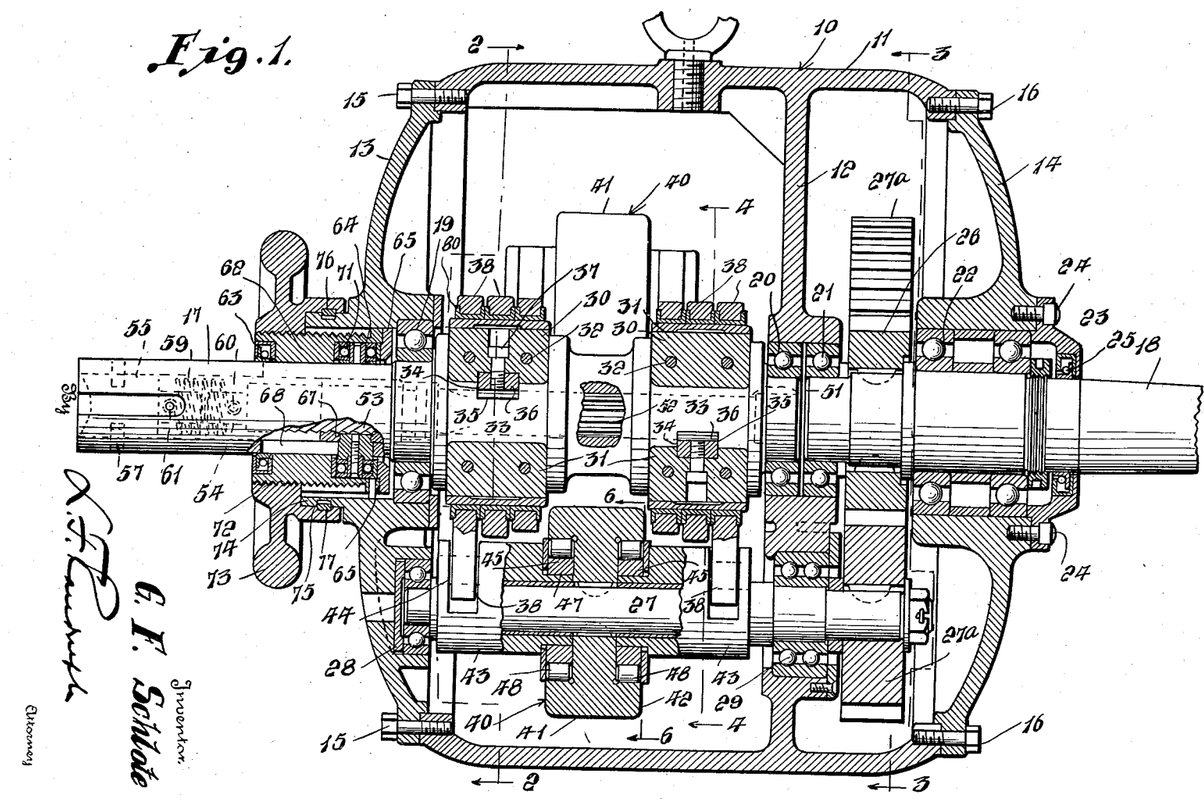
Figure 1 is a view substantially in central longitudinal section through transmission mechanism constructed according to the invention.
Figure 2:
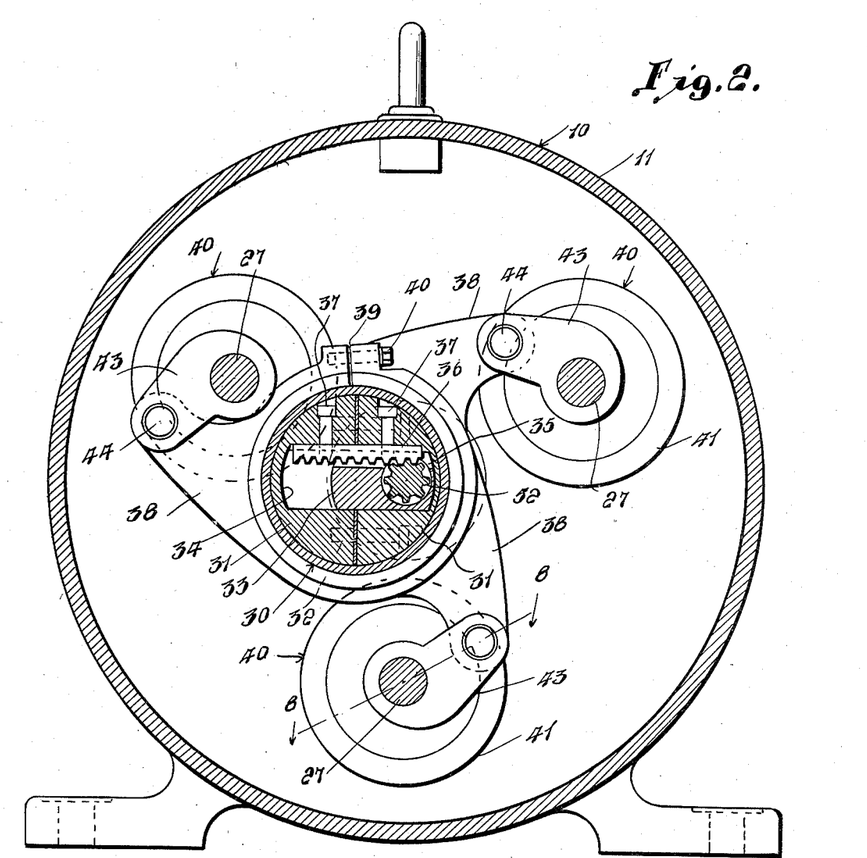
Figure 2 is a cross sectional view taken on the line 2—2 of Figure 1.
Figure 3:
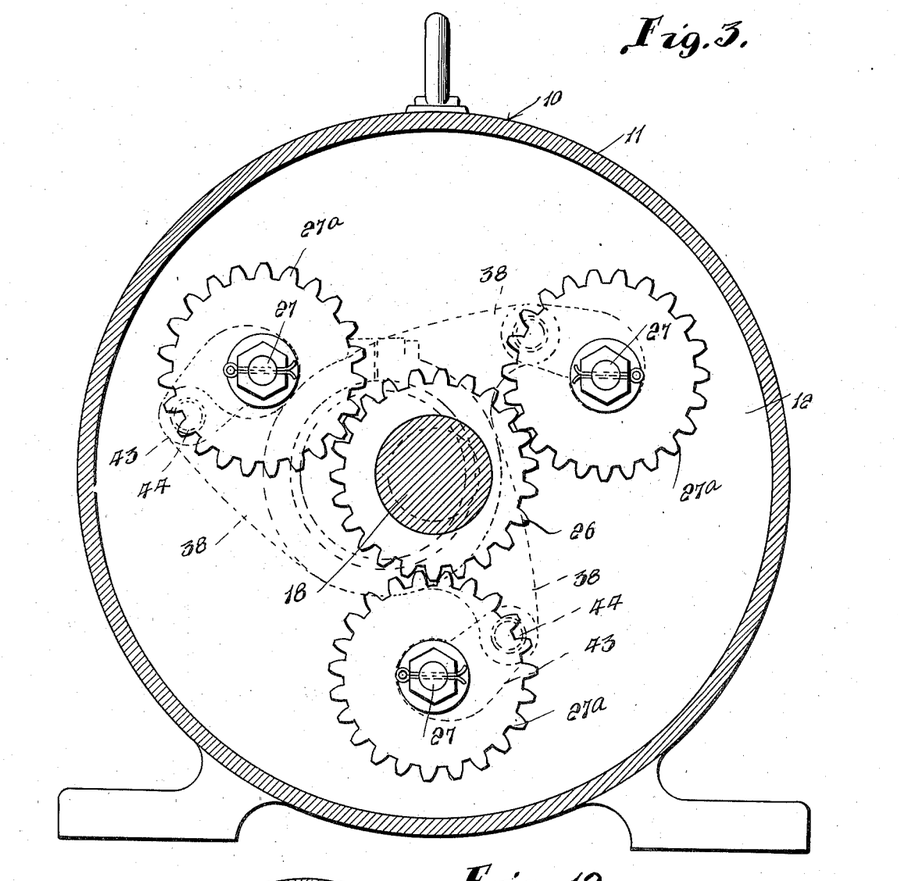
Figure 3 is a cross sectional view on the line 3—3 of Figure 1.
Figure 3A:
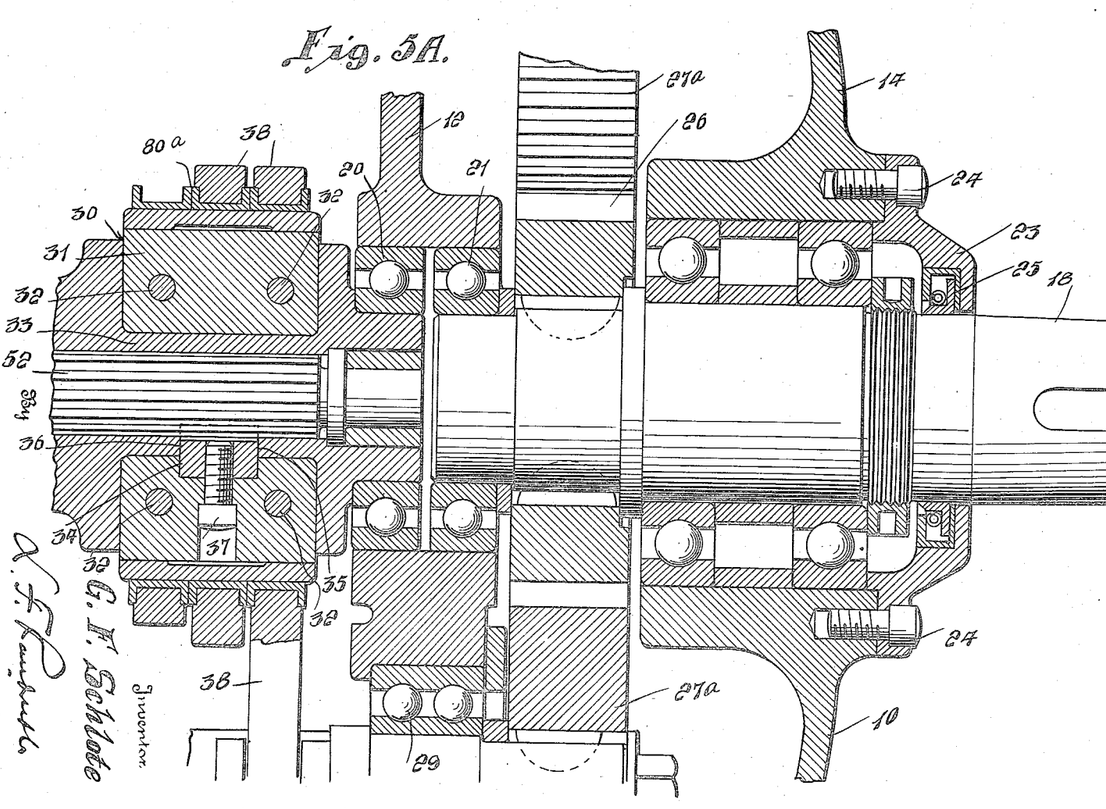
Figure 4:
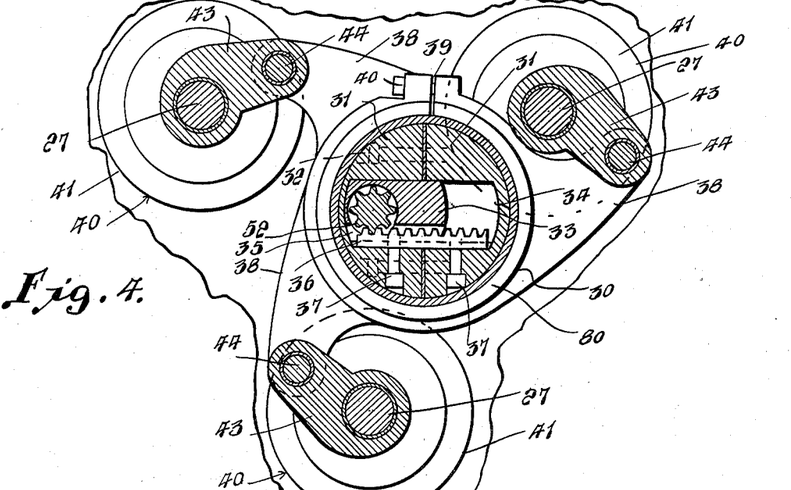
Figure 4 is a cross sectional view taken on the line 4—4 of Figure 1.
Figure 5:
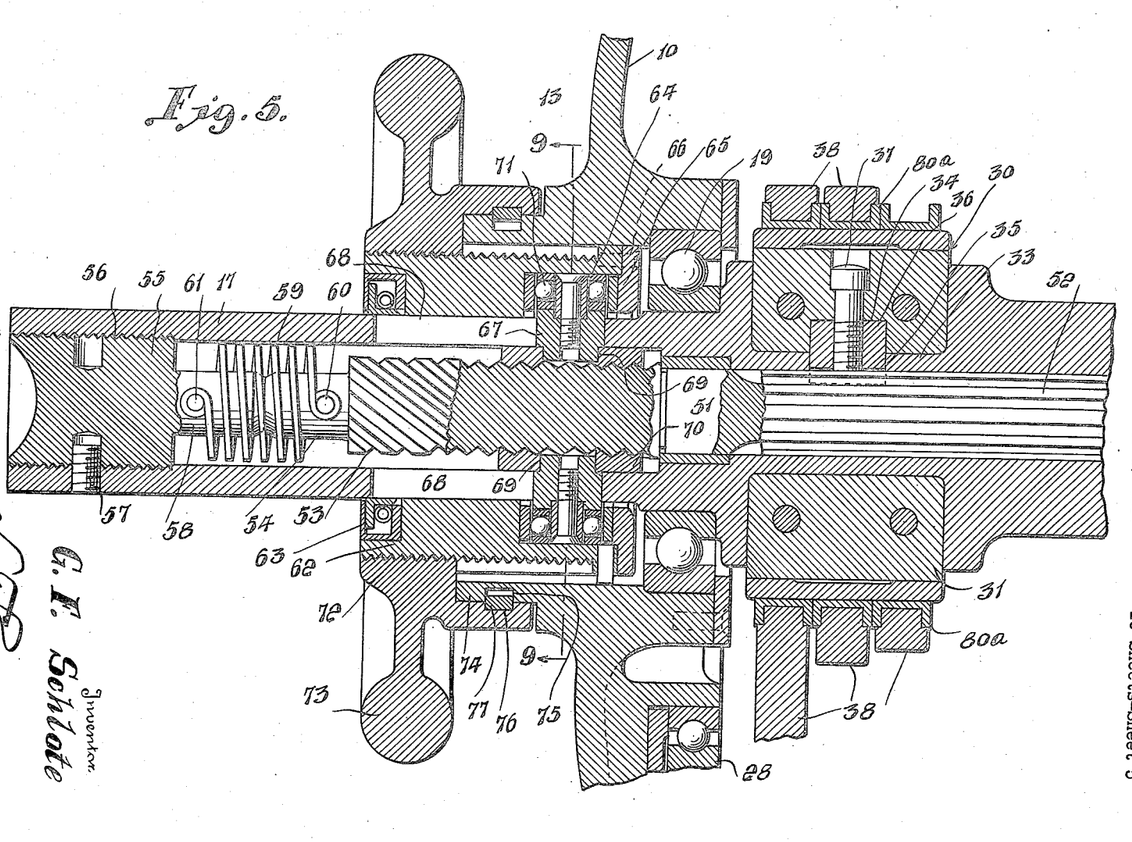
Figure 6:
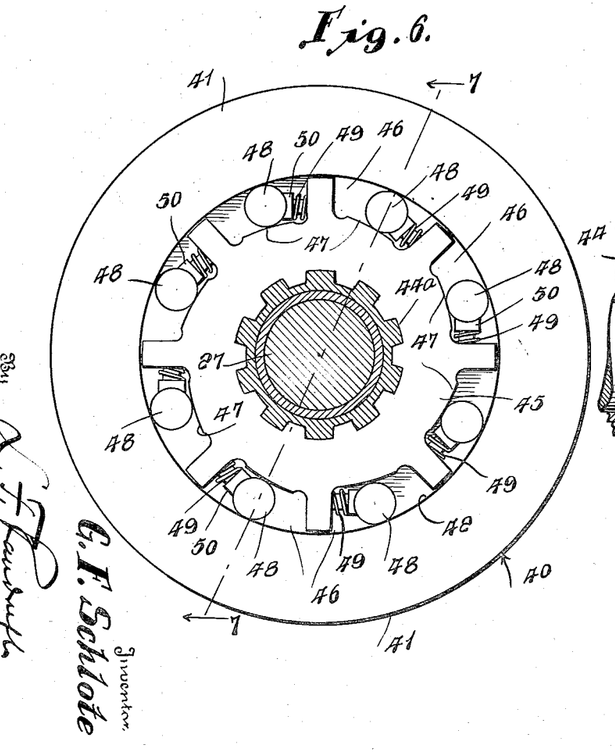
Figure 6 is a detail section taken on the line 6—6 of Figure 1.
Figure 7:
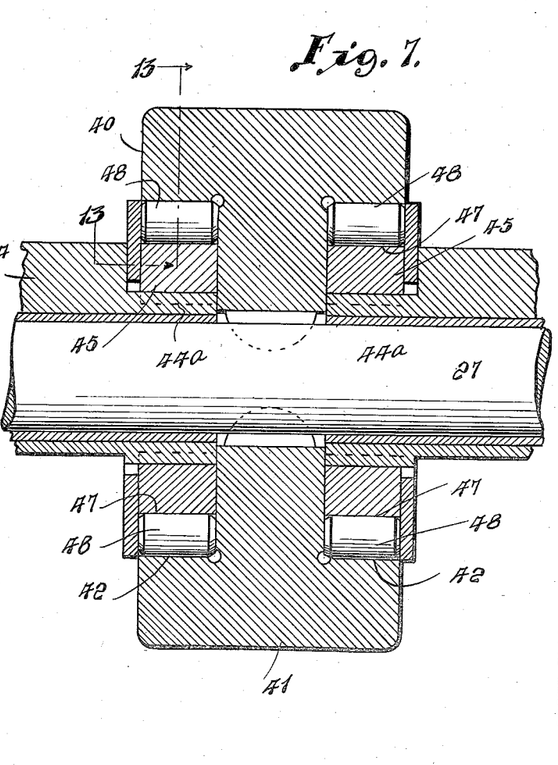
Figure 7 is a longitudinal sectional view taken on the line 7—7 of Figure 6.
Figures 8, 9, 10:
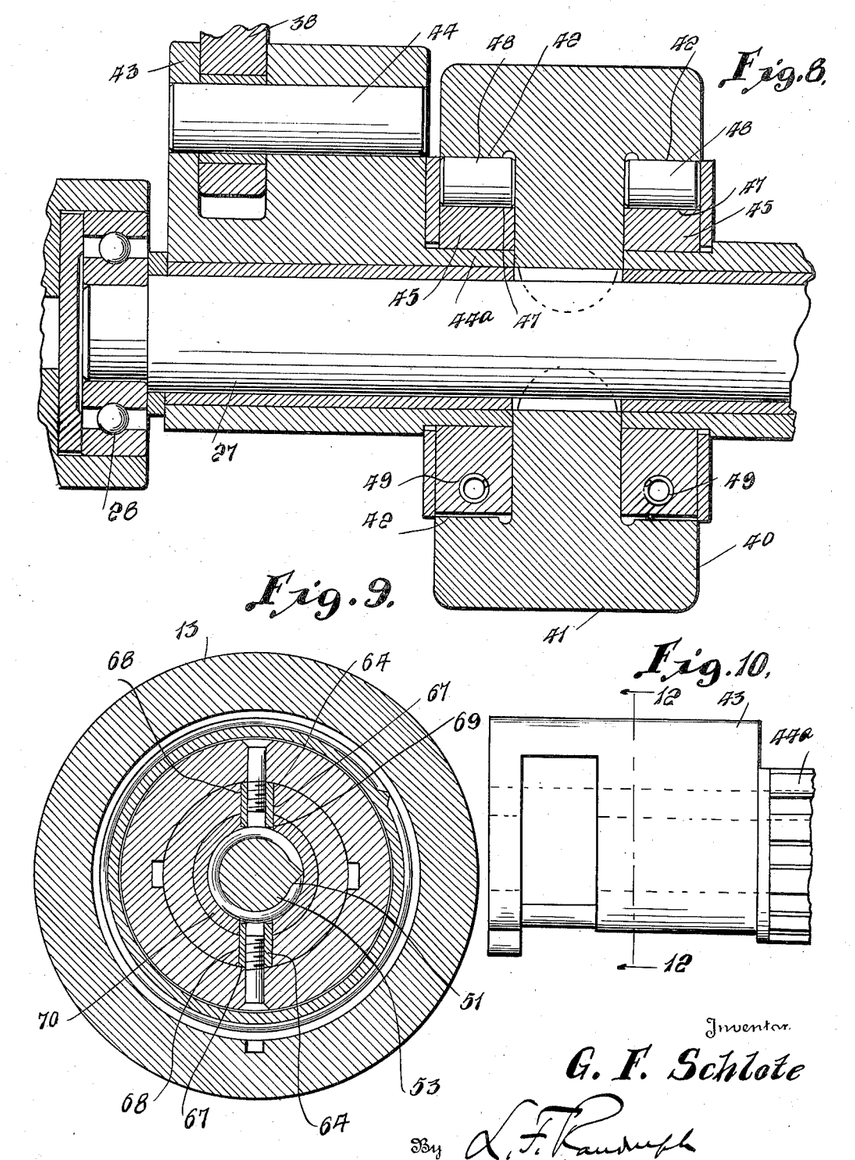
Figure 8 is a longitudinal section taken on the line 8—8 of Figure 2.
Figure 9 is a cross section taken on the line 9—9 of Figure 5.
Figure 10 is an end elevation of one of the clutch arms.
Figure 11:
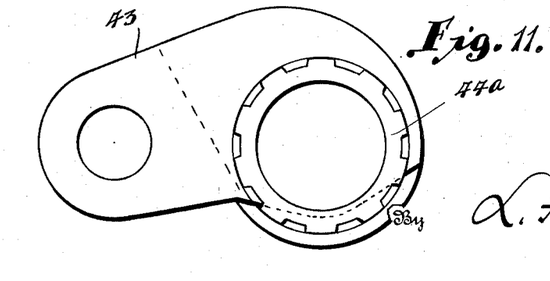
Figure 11 is a side elevation of such clutch arm.
Figure 12:
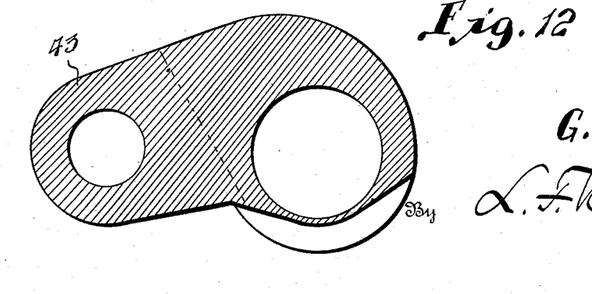
Figure 12 is a sectional view taken on the line 12—12 of Figure 10.
Figure 13:
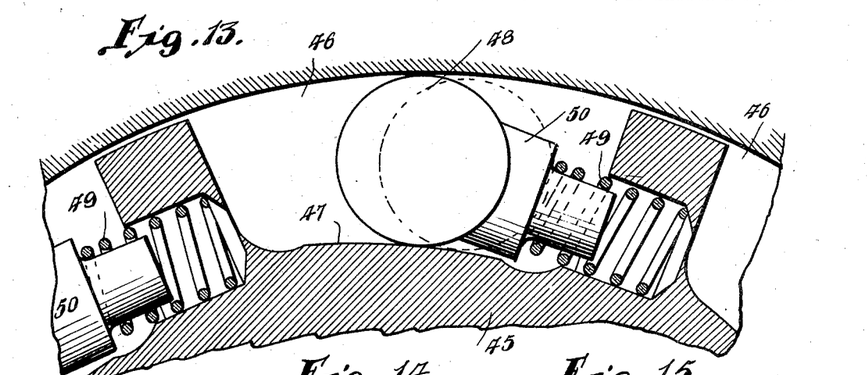
Figure 13 is an enlarged detail sectional view taken on the line 13—13 of Figure 7.
Figures 14, 15, 16, 17:
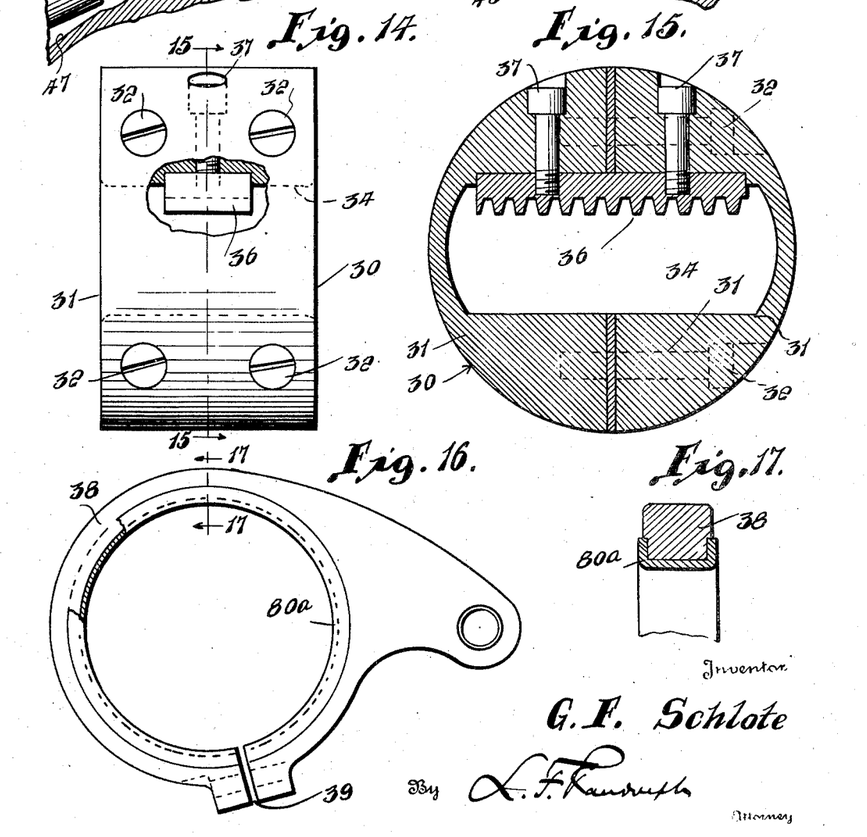
Figure 14 is a side elevation of one of the control or governor devices.
Figure 15 is a section taken on the line 15—15 of Figure 14.
Figure 16 is a side elevation of one of the ring links used between the control or governor devices and the overrunning clutch devices.
Figure 17 is a detail section taken on the line 17—17 of Figure 16.
Figure 18:
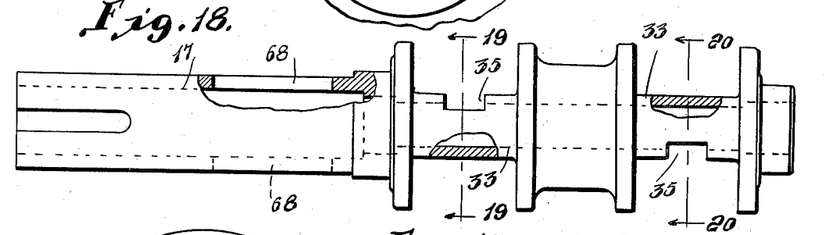
Figure 18 is a side elevation, partly broken away to disclose details, of the forward shaft section.
Figure 19:
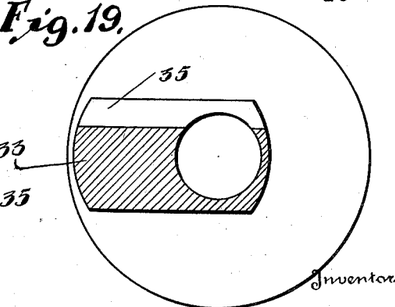
Figure 19 is a detail section taken on the line 19—19 of Figure 18.
Figure 20:
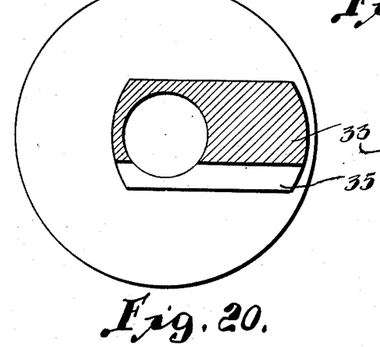
Figure 20 is a detail section taken on the line 20—20 of Figure 18.

Overrunning clutch devices are provided at 40 on each auxiliary shaft 27. These overrunning clutch devices comprise bodies or heads 41 keyed or otherwise fixed on the shafts 27 and which heads are recessed from opposite sides at 42. Clutch arms 43 are pivoted at 44 to the ring links 38 and such clutch arms have lateral extensions 44a carrying clutch heads 45 which are located in the recesses 42 to coact with the clutch heads 41. The clutch heads 45 have peripheral notches 46 in which are cam surfaces 47 and coacting cylindrical clutch members or elements 48, urged into clutching position by means of expansive springs 49, and associated slidable followers 50, bearing against the clutch members 48. It will be seen from Figure 6, that rotation of the clutch head 45 counter clockwise will be independently of head 41 while clockwise rotation of the head 45 will wedge clutch members 48 against the clutch members 41 and cause the latter to move with the head 45.

The said front section or shaft 17 is hollow and it has a control and adjusting shaft 51 rotatable relative to the shaft section 17 within the hollow of the latter. Splines or teeth 52 are provided on the shaft 51 which are enmeshed with the teeth of the rack bars 36.

Shaft 51 has a screw thread at 53 and a reduced portion 54 beyond the same. The outer end of the shaft 17 is closed by a plug 55 screw threaded therein at 56 and held against turning relatively to the shaft 17 in adjusted positions by a screw as at 57. Plug 55 has an extension 58 and a coil spring 59 surrounds the extensions 54 and 58 and has opposite ends connected thereto as at 60 and 61. The shaft 51 is adapted to be turned relatively to the shaft 17 so as to place the spring 59 under torsion so as to counteract possible high centrifugal force of the governor devices 30 at concentric positions at high speed and help the adjustment for lower speed.

Said shaft 17 is journaled in a surrounding sleeve 62 and the latter has an oil retaining ring device 63 at one end about the shaft section 17. An annular or ring device 64 is located within a recessed end of the sleeve 62 and held therein by a retaining plate 65 screwed in place as at 66. This ring device is slidable with sleeve 62 and it has extensions 67 passing through elongated slots 68 in the shaft 17 and being reduced at 69 and engaged with a slidable nut 70 having a thread engaged with the thread 53. Ball-bearing devices 71 are preferably located about the ring device 64, so as to reduce their friction.

Said sleeve 62 is exteriorly screw threaded and in screw threaded engagement therewith as at 72 is a rotatable hand wheel 73 journaled on a reduced portion 74 of the casing 10. Such reduced portion has an annular groove 75 opposite an annular groove 76 in the wheel and which grooves are engaged by a split expansive connecting ring 77, which ring secures the parts together against separation but with permissible turning.

Presuming operation of the device, it will be realized that it is adapted to transmit power to a load in such a way as to vary the speed at the output end at will and under manual control from zero gear or standstill to any speed desired up to the given maximum limit, such maximum limit in the present instance being 66.6 percent of the input speed.

Such varying may be accomplished under load or not under load, through the turning of the wheel 73 which will cause sleeve 62 to slide, moving with it the ring device 64 and the nut 70. The movement of the nut 70 is relative to the shaft 51 and hence through the intermeshing of the threads 53 and those of nut 70, the shaft 51 will turn. Such turning movement through the splines 52, and rack members 36, will be imparted to the control or governor devices 30, causing radial motion of the latter and their central locations, the same moving in opposite directions. The motion of such devices 30 is imparted to the ring links 38 which move the arms 43 and accordingly the clutch head 45 so that the clutch members 48 will lock and cause the clutch heads 45 and 41 to pull in one direction of motion and to loosen or unlock in the other direction of motion. By means of this construction, the stroke of the parts will pull clutch heads 41 and shafts 27 in one directioin while the back-stroke thereof will be idling or recuperating. The motion of the ring links 38 will thereby be transmitted to the shafts 27, gears 28, gear 26, to the shaft 18. The motion of the ring links or connecting rods 38 will as pointed out be transmitted to the shaft 18 which will produce speed depending upon the length of the links 38 upon their respective governor or alternator devices 30. It will thus be seen that the longer the stroke of the link 38, the greater the bite of the clutch means on the heads 41, thereby the greater the speed of the auxiliary shaft and of course then, the greater the speed of the output main shaft 18. By virtue of the law of leverage, it will be noted that the power transmitted at a high reduction of speed will be great and the more the adjusting wheel 73 is turned, the farther the governor devices 30 will be moved from a concentric to an eccentric position, and the greater the stroke of the links or connecting rods 38 will be. Thus the speed will become greater until the governor devices 30 will have reached their most eccentric position, in which the high speed will have been reached at the output end or shaft 18.

A free-wheeling condition will be noted. Spring 59 will counteract possible high centrifugal force of the governor devices 30 at concentric positions at high speed and help the adjustment for lower speed.

The contacting surface of connecting rods or links 38 about the governor devices 30 is preferably lined with Babbitt metal or the equivalent as at 80.

Figure 21:
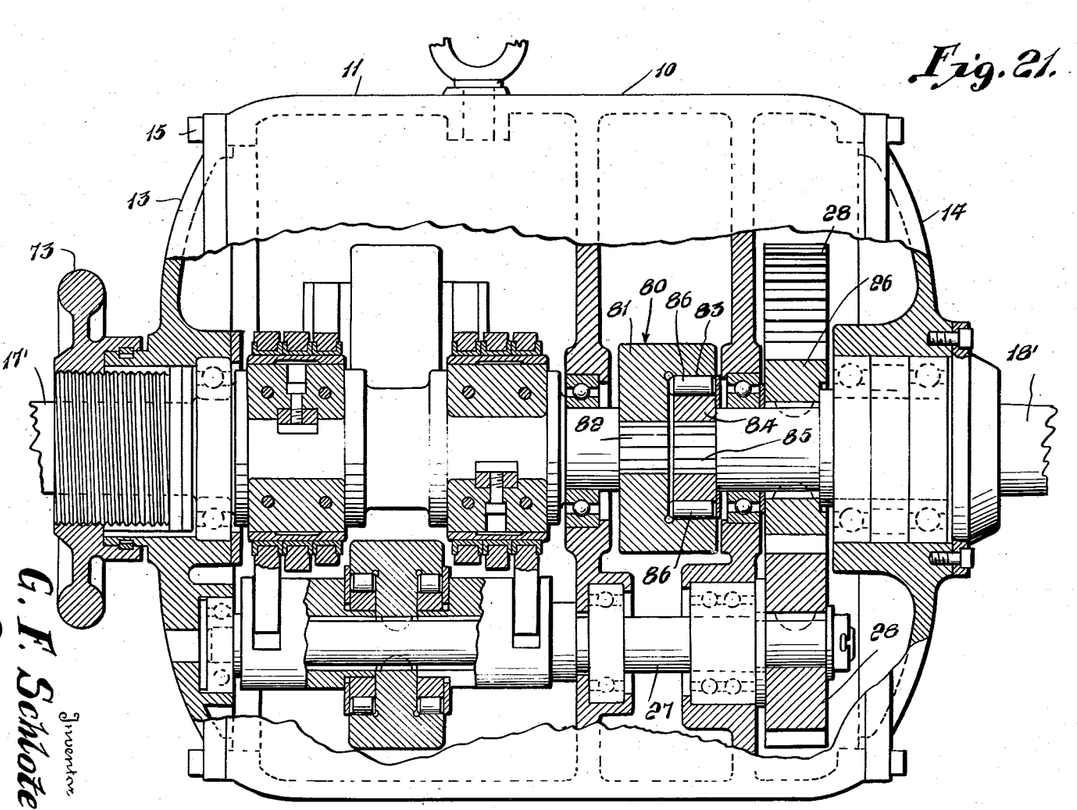
Figure 21 is a view in substantially central longitudinal section through a modified form of the device.

Various changes may be resorted to provided they fall within the spirit and scope of the invention. For example, I may resort to the modified form shown in Figure 21. The essential difference between this form and the previous form is that a free-wheeling unit is employed at 80 between shaft sections 17' and 18', corresponding to those at 17 and 18, respectively in the preceding form. The other changes reside merely in dimensions and location of bearing. This free-wheeling unit 80 is an overrunning clutch device having a head 81 fixed on the shaft 17' at 82. One face of the head 81 is recessed at 83 and operating therein is a clutch head 84 fixed at 85 on the shaft section 18'. Head 84 is shaped like that at 45, for example, and its coacting clutch members or rollers 86 are interposed between the two clutch heads, shaped and functioning like those at 48. Otherwise the structure operates and is constructed like that of the preceding form. The reason for placing the free-wheel unit 80 in the location mentioned is to eliminate a free-wheeling condition in case the rear shaft 18' should turn faster than the front shaft 17', thereby furnishing in combustion engine driven transmission units of this kind, a means of applying a compression brake, such as in cars of today without free-wheeling attachments. This additional unit 80 will operate so that if the power supply for the transmission is shut off, then the load will have to turn the engine until the load has ceased to idle at the rear main shaft; however, if the power is turned on again, then this unit 80 will disconnect at once the two shafts and the power will be transmitted through the auxiliary shaft, since the front in-put shaft is turning faster than the out-put shaft until the two shafts speed will reach a proportion of 1:1, at which point this unit between the two shafts will commence to operate.

I claim as my invention:

1. An eccentric mechanism for use in an intermittent grip device comprising a rotatably adjustable shaft adapted to be housed within a drive shaft, a governor device having an opening through which the first shaft passes, gear means between the first shaft and governor device at said opening to move the governor device laterally with respect to the first shaft through turning of the latter, means to secure the first shaft in different angular positions, a spring connected to the first shaft, and means mounting said spring operable to place the spring under torsion in opposition to the load to be responsive to the torque delivered.

2. An eccentric mechanism for use in an intermittent grip device comprising a rotatably adjustable shaft adapted to be housed within a drive shaft, a governor device having an opening through which the first shaft passes, gear means between the first shaft and governor device at said opening to move the governor device laterally with respect to the first shaft through turning of the latter, a nut threaded on said first shaft, means operable to move the nut to cause turning of the first shaft to different angular positions, a spring connected to the first shaft, and means mounting said spring operable to place the spring under torsion in opposition to the load to be responsive to the torque delivered.

3. An eccentric mechanism for use in an intermittent grip device comprising a rotatably adjustable shaft adapted to be housed within a drive shaft, a governor device having an opening through which the first shaft passes, gear means between the first shaft and governor device at said opening to move the governor device laterally with respect to the first shaft through turning of the latter, a nut threaded on said first shaft, means operable to move the nut to cause turning of the first shaft comprising a ring device engaging the nut and a sleeve slidable to operate the ring device, a spring connected to the first shaft, and means mounting said spring operable to place the spring under torsion in opposition to the load to be responsive to the torque delivered.

4. An eccentric mechanism for use in an intermittent grip device comprising a rotatably adjustable shaft adapted to be housed within a drive shaft, a governor device having an opening through which the first shaft passes, gear means between the first shaft and governor device at said opening to move the governor device laterally with respect to the first shaft through turning of the latter, a nut threaded on said first shaft, means operable to move the nut to cause turning of the first shaft comprising a ring device engaging the nut, a sleeve slidable to operate the ring device, an operating wheel screw threaded to the sleeve and means journaling the wheel and holding it against sliding movement, a spring connected to the first shaft, and means mounting said spring operable to place the spring under torsion in opposition to the load to be responsive to the torque delivered.

5. A mechanism of the class described having a first shaft, a shaft adjustably rotatable within and relatively to the first shaft, movable eccentric control means geared to the second shaft, a spring connected to the second shaft, means on the first shaft operable to place the spring under torsion in opposition to the load to be responsive to the torque delivered, said second shaft having a screw thread, a nut slidable along the screw thread, and means operable to slide the nut.

6. A mechanism of the class described having a first shaft, a shaft adjustably rotatable within and relatively to the first shaft, movable eccentric control means geared to the second shaft, a spring connected to the second shaft, means on the first shaft operable to place the spring under torsion in opposition to the load to be responsive to the torque delivered, said second shaft having a screw thread, a nut slidable along the screw thread, means operable to slide the nut comprising a sleeve surrounding the first shaft, a ring device slidable through movement of the sleeve, said ring device having a projection extending through an elongated slot in the first shaft and engaging said nut, and means operable to slide the sleeve.

7. A mechanism of the class described having a first shaft, a shaft adjustably rotatable within and relatively to the first shaft, movable eccentric control means geared to the second shaft, a spring connected to the second shaft, means on the first shaft operable to place the spring under torsion in opposition to the load to be responsive to the torque delivered, said second shaft having a screw thread, a nut slidable along the screw thread, means operable to slide the nut comprising a sleeve surrounding the first shaft, a ring device slidable through movement of the sleeve, said ring device having a projection extending through an elongated slot in the first shaft and engaging said nut, means operable to slide the sleeve comprising a wheel in screw threaded engagement with the sleeve, and means journaling the wheel and mounting it against sliding.

8. A mechanism of the class described having a first shaft, a shaft adjustably rotatable within and relatively to the first shaft, movable eccentric control means controlled through movement of the second shaft, a spring connected to the second shaft, means on the first shaft operable to place the spring under torsion in opposition to the load to be responsive to the torque delivered, and operating means actuated by one of said shafts.

GUIDO F. SCHLOTE.